Aug. 15, 1967  O. P. OMLEY ETAL  3,335,931

AUTOMATIC RIVETING DEVICE

Filed July 9, 1965   5 Sheets-Sheet 1

INVENTOR
Ole P. Omley
Robert A. Graham
BY Harold L. Fox
AGENT

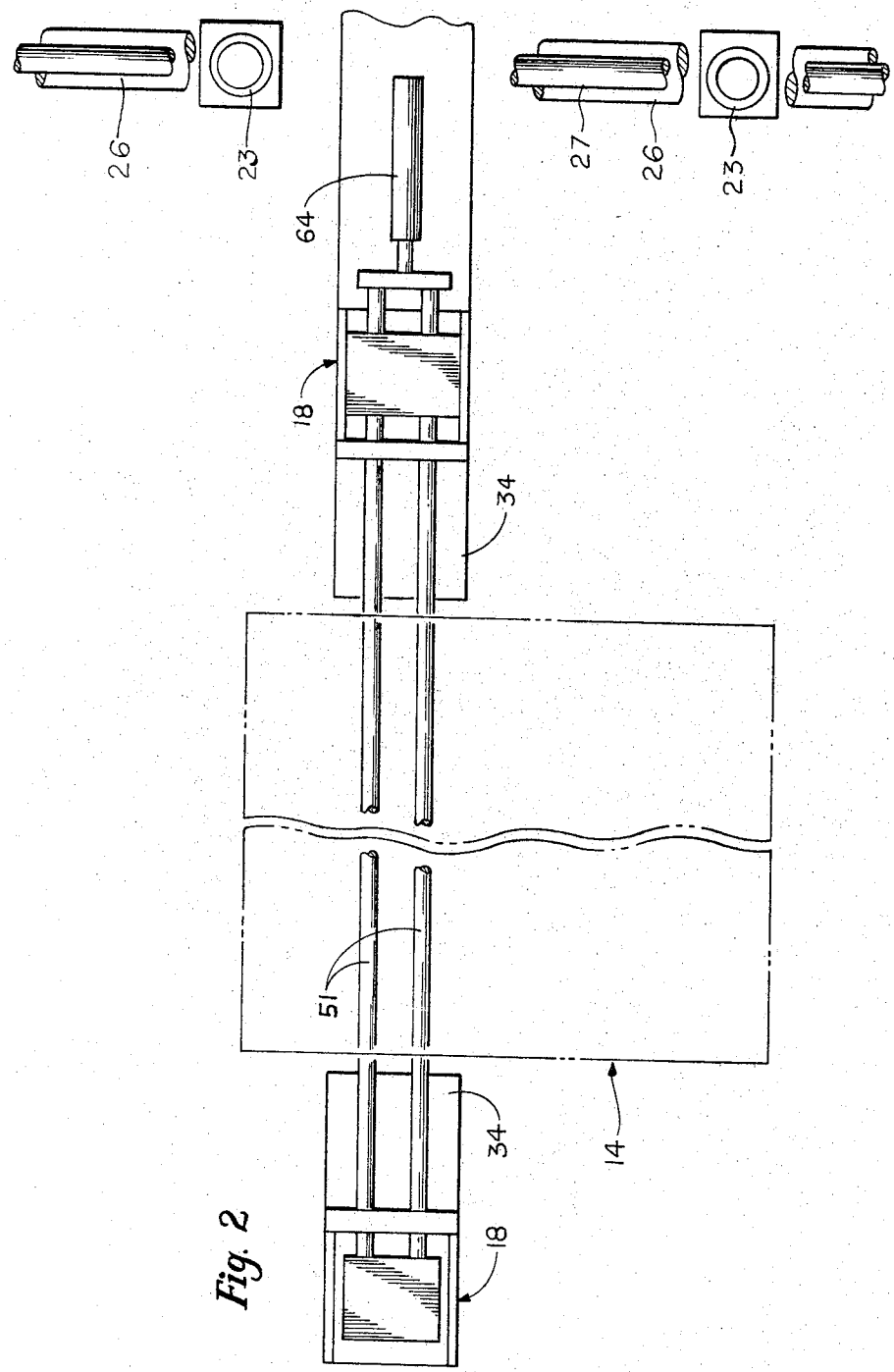

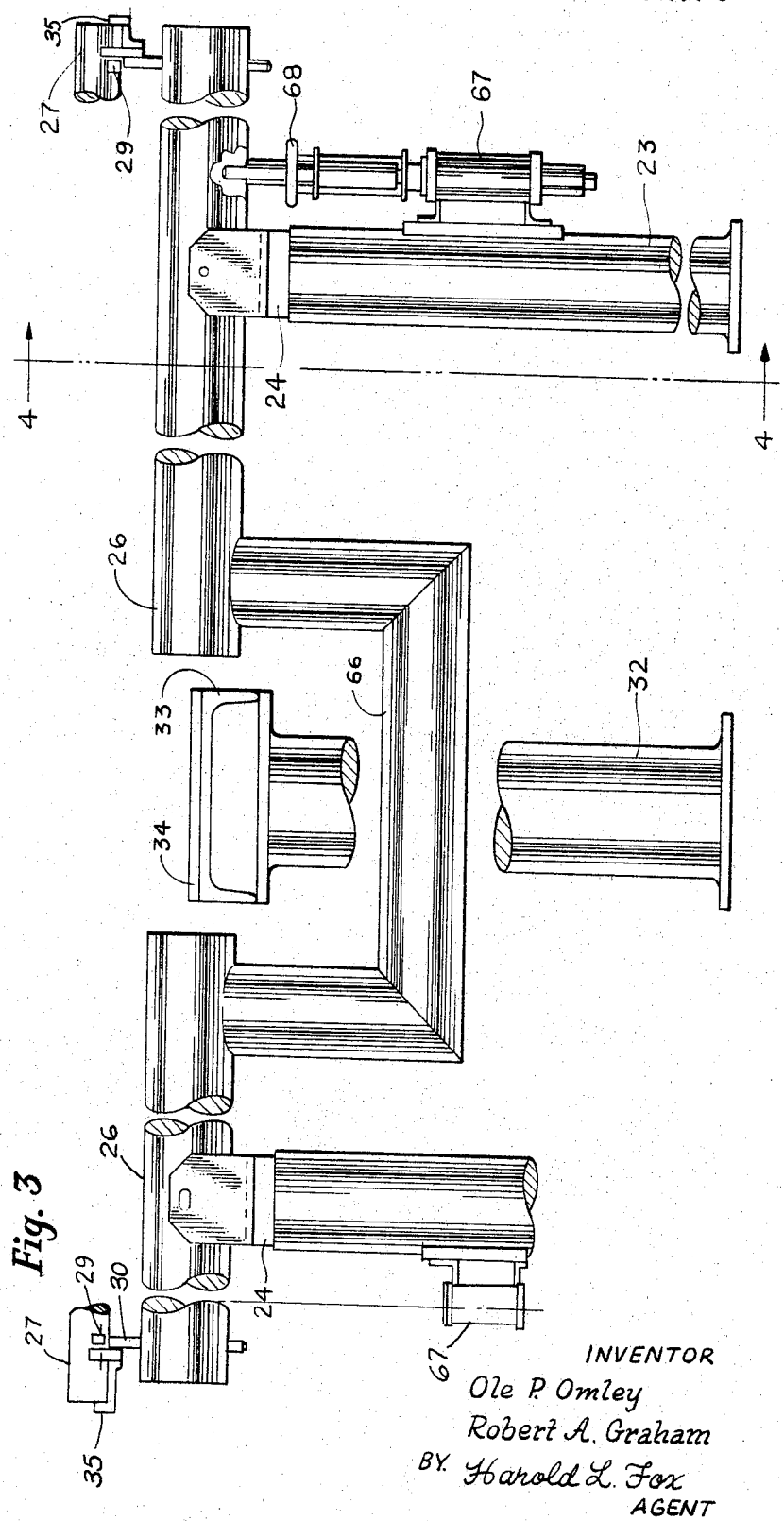

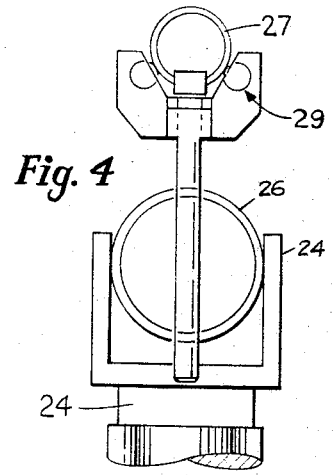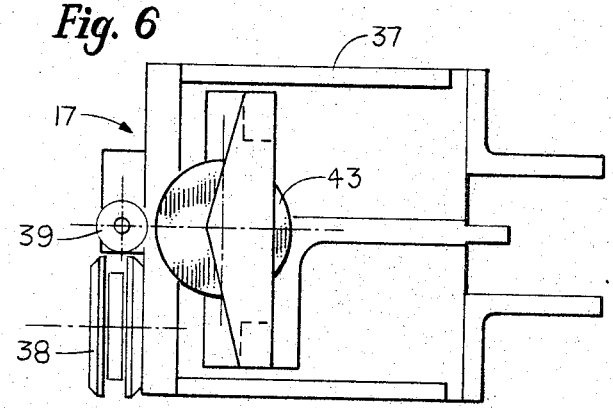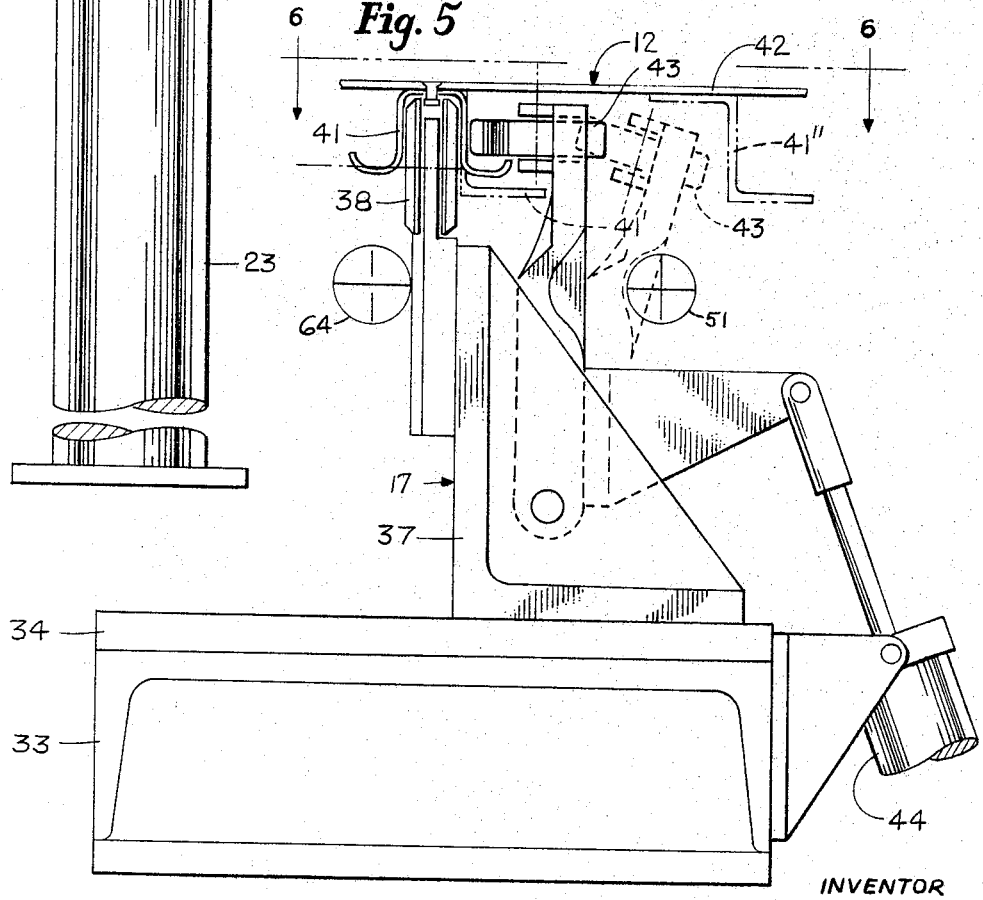

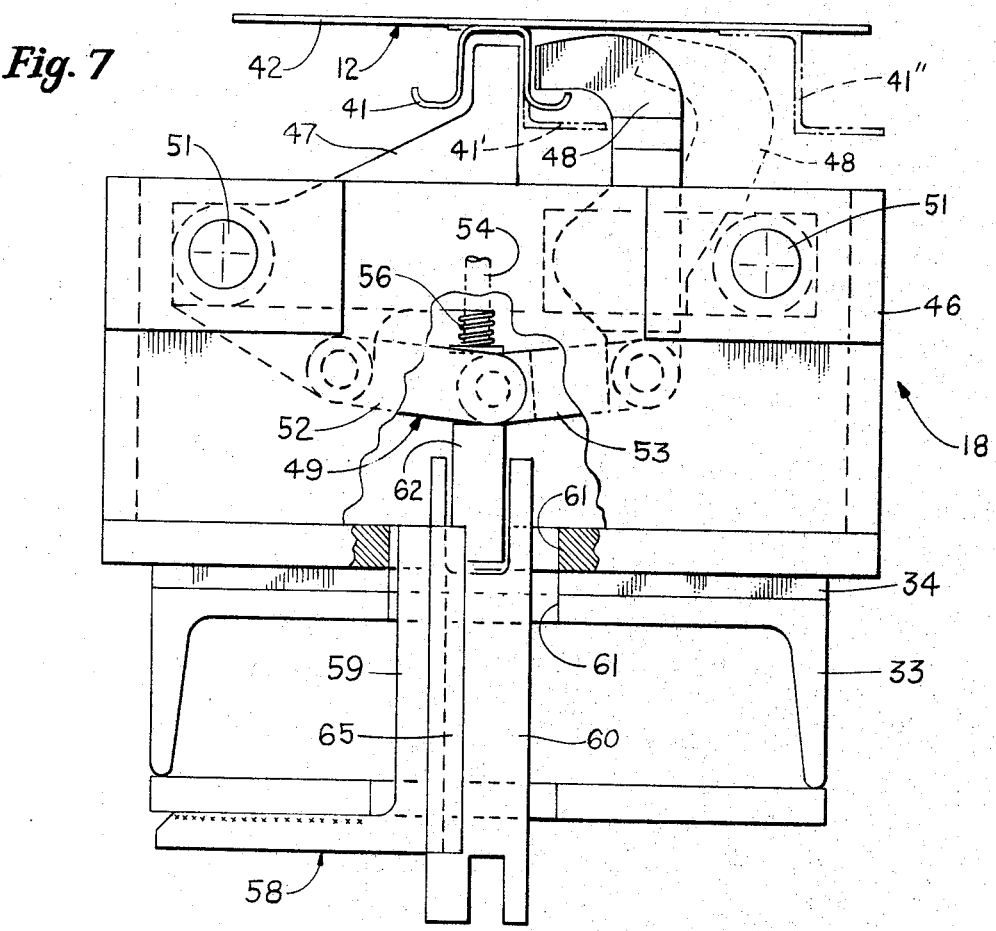

United States Patent Office 3,335,931
Patented Aug. 15, 1967

3,335,931
AUTOMATIC RIVETING DEVICE
Ole P. Omley, Inglewood, and Robert A. Graham, Rolling Hills Estates, Calif., assignors to Northrop Corporation, Beverly Hills, Calif., a corporation of California
Filed July 9, 1965, Ser. No. 470,793
1 Claim. (Cl. 227—39)

The present invention pertains to equipment adapted to render more economical and expedite a fabrication operation and more particularly to a facility adapted to render more economical and expedite the fabrication of aircraft panel sub-assemblies and similar articles utilizing a rivet operation.

Presently, aircraft have been proposed far exceeding the size of those now available, consequently panel and like assemblies must also be of large construction if aircraft of this type (large) are to be assembled economically and in minimum time. Likewise, new equipment operating more effectively and efficiently than that presently known must also be developed if assemblies for these aircraft (large) are to be produced economically.

The facility disclosed herein embodies equipment adapted to expedite and facilitate the fabrication of panel and like assemblies more economically than equipment presently known. Specifically, the present embodiment shows a stringer or strengthening member secured to a sheet (skin) member by rivets to provide a panel sub-assembly constituting a component of an aircraft. The facility shown includes an automatic machine embodying a plurality of operating heads and including supporting, guiding and advancing structures means. In the present embodiment the operating heads constitute a riveting and a pair of drilling heads, the latter heads being spaced equal distances on each side of the riveting head. Movement is imparted to the sub-assembly by the advancing means in response to predetermined operating cycles of the heads. The sub-assembly is also incrementally moved distances equal to the spacing between holes to be drilled in the sub-assembly (sheet and stringer). Thus it will be seen that, each time the sub-assembly is advanced a predetermined distance (equal to the spacing between holes), both a drilling and a riveting operation is simultaneously performed thereon. The sub-assembly is then advanced another predetermined distance and drilling and riveting operations are again simultaneously performed. This sequence is repeated until the sub-assembly is partially or completely fabricated.

Accordingly, it is an object of the present invention to provide a fabricating facility including a machine carrying a plurality of operating heads and functioning to effect simultaneously two or more operations each time a sub-assembly mounted in the machine is incrementally advanced.

Another object is to provide a facility adapted to fabricate a sub-assembly, for example an aircraft panel sub-assembly, by a riveting operation not requiring a conventional frame member for holding the components comprising the sub-assembly.

Another object is to provide a fabrication facility adapted to operate automatically and functions to reduce the time required to effect a fabrication operation over presently known operations of this type.

Although the characteristic features of the present invention are particularly pointed out in the appended claim, the invention itself, also the manner in which it may be carried out, will be better understood by referring to the following description taken in connection with the accompanying drawings forming a part of this application and in which:

FIGURE 2 is a fragmentary top plan view of FIGURE 1, certain portions of the facility being shown in phantom construction for purposes of clarity.

FIGURE 3 is a view taken along line 3—3 of FIGURE 1.

FIGURE 4 is a sectional view as indicated by the line 4—4 of FIGURE 3.

FIGURE 5 is a section as indicated by the line 5—5 of FIGURE 1.

FIGURE 6 is a view of FIGURE 5 taken as indicated by the arrows 6—6 in FIGURE 5 with the assembly being fabricated thereon removed.

FIGURE 7 is a view taken along lines 7—7 of FIGURE 1.

FIGURE 8 is a top plan view of FIGURE 7 with the assembly being fabricated thereon removed.

Figure 1:
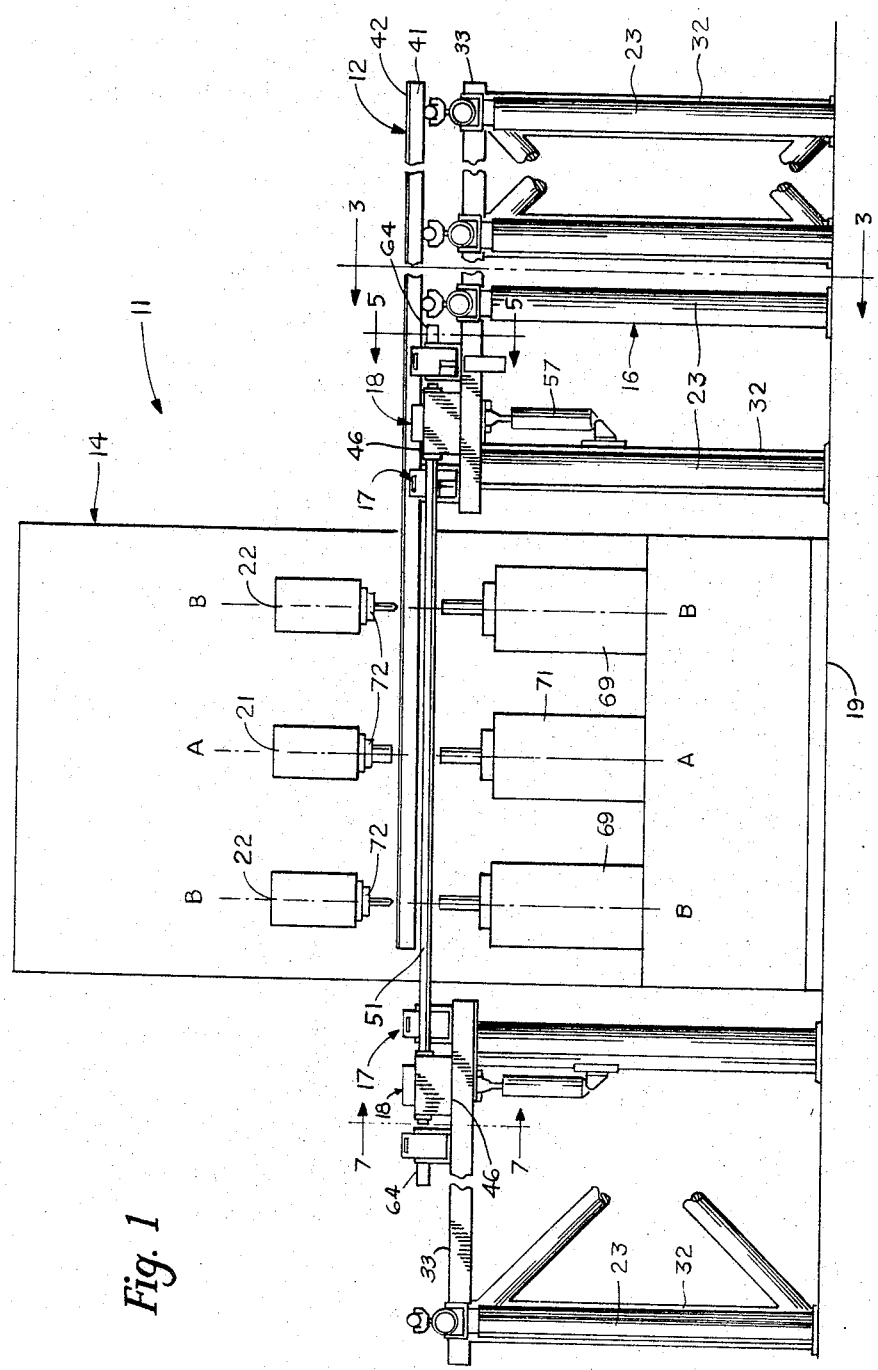
FIGURE 1 is a front elevational view of the facility disclosed herein, portions of the facility being shown in section and other portions omitted for clarity, the remaining components being shown in their operating relationship.

Referring to the drawings, FIGURE 1 shows a facility 11 of the type disclosed herein adapted to facilitate and expedite the fabrication of plate-like sub-assembly 12 usable in the fabrication of aircraft. Although the sub-assembly 12 constitutes a panel assembly or a partially fabricated panel assembly for an aircraft, it is to be understood that the facility has other applications and may be utilized in the fabrication of other assemblies and/or sub-assemblies.

Throughout the present application the terms "fabricate" and/or "fabrication" refer to a riveting operation in which one or more members are secured together by rivets, for example a stringer or strengthening member is secured to a side surface of a sheet member. The terms as used herein include all necessary drilling, counter-sinking, riveting and any intermediate operations to be performed.

The facility 11 includes a machine 14, supporting structure 16 and guiding and advancing means 17 and 18, respectively. The machine 14 and structure 16 are mounted on the floor 19 of a building housing the facility 11 and have a specific relationship with respect to each other, this relationship will be further discussed and explained as the disclosure progresses.

The machine 14 is automatic and functions similarly as presently known machines adapted to effect a similar operation. The principal exception being that the subject machine includes a riveting and a pair of drilling heads 21 and 22, respectively, having a fixed relation on the machine 14. The tools mounted in the heads 21 and 22 are movable in vertical directions only about their respective axes A—A and B—B located in a common plane extending laterally of the machine 14. The heads 21 and 22 are preferably hydraulically actuated, the drilling heads 22 are constructed and operate substantially as the drilling head assembly shown and described in our copending application, Ser. No. 364,579; the riveting head operating in a conventional manner. The riveting head 21 is located at the mid-point of the head of machine 14, considered in a lateral sense, and the drilling heads 22 are equally spaced on each side of the head 21. Although only three heads are shown in the present embodiment it should be understood that a plurality of heads may be mounted on the machine 14. Additional features of constructions and operation of the machine 14 and heads 21 and 22 will be further described in connection with the overall operation of the facility 11.

The structure 16 supports the sub-assembly 12 a predetermined distance above the floor 19. Specifically, structure 16 constitutes means supporting the sub-assembly 12 and allows incremental movement to be imparted thereto while the heads 21 and 22 perform their respective operations. The structure 16 also functions to allow lateral and longitudinal movement of the sub-assembly 12 with respect to the heads 21 and 22. The structure 16 includes spaced rows of individual hollow cylindrical members 23 mounted in a vertical attitude on the floor 19. The rows of members 23 extend on each side of the machine 14 a distance at least equal to length of the sub-assembly 12 and are further characterized in that each individual row of the members 23 has a parallel spaced relation with respect to the common plane containing the axes A—A and B—B. The individual members 23 constitute respective pairs of members, each respective pair having a spaced side by side relation when considered in a lateral sense (FIGURE 2).

Mounted at the upper ends of the members 23 are members 24 (FIGURES 3 and 4) having a telescopic arrangement therein for movement between extended and retracted positions for a purpose presently explained. Mounted between the upper ends of respective members 24 are cross-members 26, the function and construction of which will also be described further as the disclosure progresses. The members 26 carry brackets 30 which in turn carry roller members 29 mounted for rotation therein. Roller members 27 are supported by the brackets 30 (roller members 29) and provide means on which the sub-assembly 12 is positioned enabling it to be moved either to the right or left of the machine 14, and also manually shifted fore and aft of the machine 14 as presently described. Brackets 30 also carry auxiliary brackets 35 which function to maintain the members 27 in their proper position on the roller members 29.

A plurality of members 32, substantially the same length as the members 23, support the guiding and advancing means 17 and 18, respectively. The members 32 are also vertically mounted on the floor in spaced relation and in a straight line on each side of the machine 14, center lines of the members 32 coincide with the aforementioned common plane containing the axes A—A and B—B. Mounted in an inverted position on the upper ends of the members 32 is a channel member 33 carrying a plate 34 arranged as shown in FIGURE 3. Mounted on the plate 34 are the guiding assemblies 17 as shown in FIGURES 1, 5 and 6.

The individual assemblies 17 include L-shaped castings 37 fixedly secured to the upper surface of the plate 34. Mounted adjacent the upper end of the casting 37 is a double roller 38 and an individual roller 39 mounted for rotation about horizontal and vertical axes, respectively. Referring to FIGURES 5 and 6, it will be seen that the rollers 38 and 39 are of a size and shape allowing them to be received between the legs of a hat-shaped stringer 41. Also mounted for pivotal movement on the casting 37 is a roller 43 adapted to be moved between spaced and opposed positions in which it is spaced (dotted line construction in FIGURE 5) and opposes (solid line construction in FIGURE 5) from the roller 39, respectively. The roller 43 is moved between its opposed and spaced positions by means of a conventional hydraulic actuator 44 mounted on a flange of the channel 33.

In the stage of fabrication shown in FIGURE 1 the sub-assembly 12 consists of the stringer 41 and a sheet 42. In this respect it should be understood that a more conventional stringer 41' (dotted construction in FIGURE 6) may be utilized instead of the stringer 41. The stringer 41 is temporarily secured to the sheet 42 by means of bolts or similar means positioned adjacent each end of the stringer to provide a desired relationship between sheet and stringer. It will now be seen that, with the sub-assembly 12 positioned on the rollers 27 with the rollers 38 and 39 received between the legs of the stringer 41 and with the rollers 43 urged to their opposed positions, the sub-assembly 12 when moved longitudinally will be guided over a course coinciding with the axes A—A and B—B of the heads 21 and 22, i.e., the heads 21 and 22 will be located directly above the centerline of the stringer 41. Also, the drilling and riveting operations, as well as operations performed by intermediate heads (if any), will be effected along a desired line. At such time as the stringer 41 is permanently secured to the sheet 42 and with the roller 43 in its spaced position, sufficient clearance is provided allowing the sub-assembly 12 to be elevated and laterally moved to a new position in which another stringer may be secured to the sheet 42, for example the stringer 41'', may be brought into association with the rollers 38, 39 and 43 similarly as in the case of the stringer 41.

The advancing means 18 is also mounted on the plate 34 (FIGURE 7). The present embodiment includes two advancing means located respectively on each side of the machine 14. The channel 33 and structure 16 terminate directly in front of the machine 14, this space being maintained vacant as components of the machine 14 occupy and operate in this space.

Each of the advancing means 18 includes a box-like structure 46, having fixed and movable jaw members 47 and 48, respectively, and linkage means 49 mounted in the structure 46. The box-like structure 46 is fixedly mounted on the plate 34 and has major portions of the components 47, 48 and 49 mounted therein. The jaw member 47 is mounted on and move with a pair of rods 51 which pass through the inboard sides of the structures 46 as best seen in FIGURE 2.

The upper end of the jaw member 47 is of a size and shape allowing it to be received between the legs of the stringer 41. The jaw member 48 is mounted for pivotal movement between opposing and spaced positions in which its upper end opposes and has a spaced relationship with respect to the upper end of the member 47 respectively. The spaced and opposed positions of the member 48 are shown in solid and dotted construction, respectively, in FIGURE 7. Pivotal movement of the member 48 is made possible in that link members 52 and 53 of the linkage means 49 are pivotally secured together to the members 47 and 48 substantially as shown in FIGURE 7. The members 47 and 48, and the members 52 and 53 are relatively wide, the extent of these members being only slightly narrower than the inside measurement of the structure 46. The upper end of a plunger-like member 54 and spring 56 are mounted in the non-rotational member 47 so that the member 54 continuously exerts a downward pressure on the common pivotal point of the members 52 and 53. Thus it will be seen that the jaw member 48 will be urged to its spaced position at such times as the link members 52 and 53 are acted on by the plunger member 54 only. Structure providing forces sufficiently strong to overcome the action of the spring 56 is provided by an actuator 57 (FIGURE 1) acting through a sub-assembly 58.

The sub-assembly 58 includes a right-angle member 59 one leg of which is fixedly secured to the channel member 33, the other (vertical) leg extending through an aperture 61 provided in the web of the channel 33 and plate 34 as shown. Slidably mounted by dovetail or like construction in the vertical leg of the member 59 indicated by the numeral 65, is a plunger-like member indicated by the numeral 60 in FIGURE 7. Mounted for rotation in the upper bifurcated end portion of member 60 of sub-assembly 58 for rotation about a horizontal axis is a roller member 62. Upward force is applied to the member 60 by the actuator 57 (FIGURE 1).

Limited reciprocation is imparted to the aforementioned rod members 51 by a conventional hydraulic actuator 64 mounted on the plate 34. Movement of the rod members 51 is limited by the jaw members 47 and 48 contacting the inner sides of the structure 46 as best seen in FIGURE 8. For obvious reasons, it is imperative that the inside measurement of the structure 46, indicated by the letter "$a$" in FIGURE 8, minus the width of the jaw members 47 and 48 indicated by the letter "$b$," must at least be equal to the space between adjacent holes or rivets in the assembly 12, i.e., the measurement "a" minus "b" (a—b) exceeds the spacing between the holes or rivets in the assembly 12. This latter measurement may be altered (decreased) by placing shims (not shown) around the rod members 51 and between the jaw members 47 and 48 and an inboard side of the structure 46. Also, in view of the fact that the link members 52 and 53 are relatively wide, there is provided a continuous surface contacting the roller 62 throughout movement of the link members 52 and 53.

In view of the foregoing description of the advancing means and individual guiding means 18 and 17, respectively, a brief description of their operation follows. For purposes of illustration, it is assumed that the assembly 12 is positioned on the supporting structure 16 (rollers 27 with the rollers 38 and 39 received within the legs of the stringer 41 and the members 43 urged to their opposed position). Under these conditions it will be apparent that the assembly 12 (stringer 41 and sheet member 42) will be guided under the heads 21 and 22 as the assembly is advanced. Also, it will be apparent, under the above conditions, that the end of the member 37 carrying the roller 38 will be positioned between the legs of the stringer 41. Prior to an advancing operation, the members 47 and 48 are in contact with the right side of the structure 46 (FIGURE 1) with members 48 in their spaced positions. The members 48 are now urged to their opposed positions wherein it will be apparent that the leg of the stringers member 41 will be firmly clasped between the members 47 and 48. The actuator 64 is now activated urging the members 47 and 48 to the left side of the structures 46 (FIGURE 1), the assembly 12 is thus advanced from left to right a distance equal to the spacing between the holes being drilled in the assembly. With the stringer 41 still clasped between the members 47 and 48 a hole is drilled and a rivet normally is bucked. Upon completion of this operation or operations the members 48 are returned to their spaced positions, the members 47 and 48 are returned to the side of the structures 46 and the operation repeated.

Referring to FIGURE 3, it will be noticed that the cross-members 26 are not straight, rather they are depressed at their mid-sections as indicated by the numeral 66. Constructed in this manner the depressed portions of the members 26 provide clearance for the channel member 33 and allow the member 26, also roller member 27 supported thereon, to be elevated a predetermined distance above the member 33. Elevating the cross-members as described above raises the sub-assembly 12 with respect to the rollers 38, 39 and 43 of the guiding means 17, and also with respect to the members 47 and 48 of the advancing means 18, to a position in which these components clear the stringer 41. Accordingly the sub-assembly 12 may be manually moved laterally and subsequently lowered on the members 27 to a new position and locked in this position by a locking means 68; for example, a position in which the rollers 38, 39 and 43 and the members 47 and 48 are associated with the stringer 41″.

Elevating and/or lowering the cross-members 26 as described above is accomplished by hydraulically operated actuators 67 fixedly secured to the members 23 (FIGURE 3). It will be noticed that locking means 68 are provided between the actuator and cross-member 26 whereby the relationship of the various cross-members may be selectively adjusted, within limits, and subsequently locked in a desired position.

Referring again to FIGURE 1, other essential components of the machine 14 include hydraulically operated drilling and riveting anvils 69 and 71, respectively, located at the base of the machine 14. The axes of the anvils coincide with axes A—A and B—B of the operating heads with which they are associated. Also pressure rings 72 are provided in connection with the heads 21 and 22, these rings functioning to insure complete contact and provide additional insurance against movement between the sheet 42 and stringer 41 during drilling and/or riveting operations. Although the sub-assembly 12 is firmly held by the advancing means 18 during drilling and riveting operations, the rings 72 contact the surface of the sheet 42 at substantially the same time as the anvils 69 and 71 contact the underside of the stringer 41. The rings 72 also function to open and close switches shown in FIGURE 9.

It will be seen by referring further to FIGURE 1 that one of the advancing means 18 is positioned immediately adjacent each side of the machine 14, also the supporting structure 16 extends equal distances, at least equal to the length of sub-assembly 12, on each side of the machine 14. This design insures that the sub-assembly 12 will be positively advanced as it approaches and leaves its position adjacent the operating heads 21 and 22, and that support will be provided for the stringer 41 and sheet 42 at the beginning and end of an operation. Also the rollers 27 are at least twice the width of the sub-assembly 12. Thus it will be seen that full support will be provided for the sub-assembly 12 as the latter is shifted laterally enabling other stringers, for example the stringer 41″, to be received between the roller members 39 and 43.

In the operation of the facility 11 let it be assumed the sub-assembly 12 is advancing from right to left as shown in FIGURE 1. The sequence of operation of the facility is substantially as follows:

(1) The sub-assembly is positioned on the supporting structure 16 (rollers 27) in a manner in which the rollers 38 and 39 and member 47 (FIGURE 7) are received between the legs of the stringer 41.

(2) The guiding means 17 is actuated; specifically the roller members 43 being urged into their opposed positions in which movement of the stringer is confined and the sub-assembly 12 caused to travel a desired course as previously described.

(3) The riveting head and associated components of the facility 11 are temporarily rendered inoperative.

(4) The sub-assembly 12 is manually moved (longitudinally) to a position in which the first hole of a series or set of holes is to be drilled.

(5) The jaw members 47 and 48 are urged to the left end of the box-like structure 46 in which they are located.

(6) The right-hand pressure ring 72 now descends, contacting the surface of the sheet 42. Simultaneously the corresponding anvil 69 ascends contacting the web of the stringer 41. The sheet 42 and stringer 41 are now firmly held together and the first hole of a current series is drilled.

(7) After the first hole in the current series is drilled, the drill, ring 72 and anvil 71 are retracted.

(8) In response to this movement jaw member 48 is released from the stringer 41, the latter being moved to the right end of the box-like structure by the actuator 64.

(9) As the members 47 and 48 contact the right end of the box-like structure 46 the members 48 are again urged to their opposed positions where they are closed, the return travel of members 47 and 48 being again effected by the actuator 64.

(10) As the members 47 and 48 again reach the left end of the structure 46 the right drill is again activated and the second hole in the current series drilled.

(11) The operation, as described above, is repeated until the first hole in the current series is directly under the riveting head 21, at which time the riveting head and associated component are rendered operational. Thereafter drilling and riveting operations are simultaneously and automatically performed until all the holes in the current series are drilled and rivets positioned therein and bucked, or until the facility 11 is deactivated.

The sequence of operation as set forth above is carried out through the provision of appropriate electric relays and switches as will be obvious to one skilled in the art.

The two drilling heads 22 provided with each riveting head 21 allow the sub-assembly 12 to be fed in either direction through the machine. Only the drilling head preceding the riveting head in the direction of feed will be used at one time.

Accordingly it is seen that a facility adapted to automatically perform the fabrication of panel assemblies and similar articles without mounting the assemblies in a fixed jig or frame, and providing the other objects enumerated above, is provided in one form of the invention as described herein.

While in order to comply with the statute, the invention has been described in language more or less specific as to structural feature, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

We claim:

In a facility adapted to facilitate the fabrication of panel-like sub-assemblies including a structural sheet and an elongated strengthening member temporarily secured thereto with a flat portion thereof having a flush relation with a surface of the sheet and a plane portion extending normal to the surfaces of the sheet the combination comprising:

(a) a machine including a frame and having a plurality of operating heads having a fixed relation with respect to said frame and in which the operating axes of said heads are located in a common plane;

(b) guiding means, including a plurality of sets of rollers, extending equally on each side of said machine;

(c) the sets of rollers of said guiding means having spaced and opposed positions and the plane portion of the strengthening member being received between being received between certain of said sets of rollers and the latter cooperating to direct the sub-assembly over a desired course at such time as said sets of rollers are in said opposed positions;

(d) at least two clamp assemblies including fixed and removable jaw members and said movable jaw members having spaced and opposed positions with respect to said fixed jaw member and said clamp assemblies being located adjacent to and on each side of said machine;

(e) said clamp assemblies adapted to impart incremental movement, including advancing and rest periods, to said sub-assembly at such time as the plane portion of the strengthening member is positioned between said jaw members and said movable jaw members are in said opposed positions;

(f) and means adapted to actuate said facility in which said heads function to perform drilling and riveting operations during said rest periods whereby the strengthening member is permanently riveted to said sheet.

References Cited

UNITED STATES PATENTS

| | | | |
|---|---|---|---|
| 222,568 | 12/1879 | Bray | 227—57 |
| 1,301,600 | 4/1919 | Pierce | 227—52 |
| 1,467,536 | 9/1923 | Dornier | 227—61 |
| 2,216,403 | 10/1940 | Oeckl et al. | 227—61 X |
| 2,246,494 | 6/1941 | Amiot | 227—58 |

GRANVILLE Y. CUSTER, JR., *Primary Examiner.*